United States Patent

[11] 3,608,006

[72] Inventors: Kirokuro Hosoda, Yokohama; Naonori Shiina, Tokyo; Hideyo Ueno, Tokyo; Junnosuke Sasajima, Yokohama; Junichi Yanase, Yokohama; Tetsuo Itoh, Funabashi; Terutoshi Ohsumi, Matsudo, all of Japan
[21] Appl. No.: 670,434
[22] Filed: Sept. 25, 1967
[45] Patented: Sept. 21, 1971
[73] Assignee: The Furukawa Electric Company Limited, Tokyo, Japan
[32] Priority: Oct. 1, 1966
[33] Japan
[31] 41/64,703

[54] PRODUCTION OF FOAMED POLYOLEFIN COMPOSITE SHEET
17 Claims, 1 Drawing Fig.
[52] U.S. Cl. .................................................. 264/47, 156/79, 260/2.5 R, 264/45, 264/54, 264/257, 264/321, 264/DIG. 16, 264/DIG. 18
[51] Int. Cl. .................................................. B29d 27/00
[50] Field of Search .................................................. 264/54, 47; 260/2.5

[56] References Cited
UNITED STATES PATENTS

| | | | |
|---|---|---|---|
| 3,098,832 | 7/1963 | Pooley | 264/54 X |
| 3,111,496 | 11/1963 | Hunter | 260/2.5 |
| 3,192,294 | 6/1965 | Streed | 264/54 |
| 3,293,108 | 12/1966 | Nairn | 264/47 X |
| 3,341,480 | 9/1967 | Feild | 264/54 X |
| 3,342,911 | 10/1967 | Funahashi | 264/54 X |
| 3,382,194 | 5/1968 | Birkett | 264/47 UX |
| 3,386,878 | 6/1968 | Pooley | 264/54 X |
| 3,399,106 | 8/1968 | Palmer | 264/47 X |
| 3,411,967 | 11/1968 | Rowland | 260/2.5 X |
| 3,452,123 | 6/1969 | Beckmann | 264/53 |

Primary Examiner—Donald J. Arnold
Assistant Examiner—Paul A. Leipold
Attorney—Stevens, Davis, Miller & Mosher ABSTRACT: Production of a foamed polyolefin composite sheet, which comprises milling the polyolefin with a cross-linking agent and a blowing agent homogeneously to obtain a composition, moulding the composition into a sheet, adhering the sheet with a lining such as cloth or paper by means of an adhesive to form a composite sheet and then heating the composite sheet at a temperature higher than the decomposition temperatures of the cross-linking agent and the blowing agent to form cross-linkage and foam and subjecting to embossing.

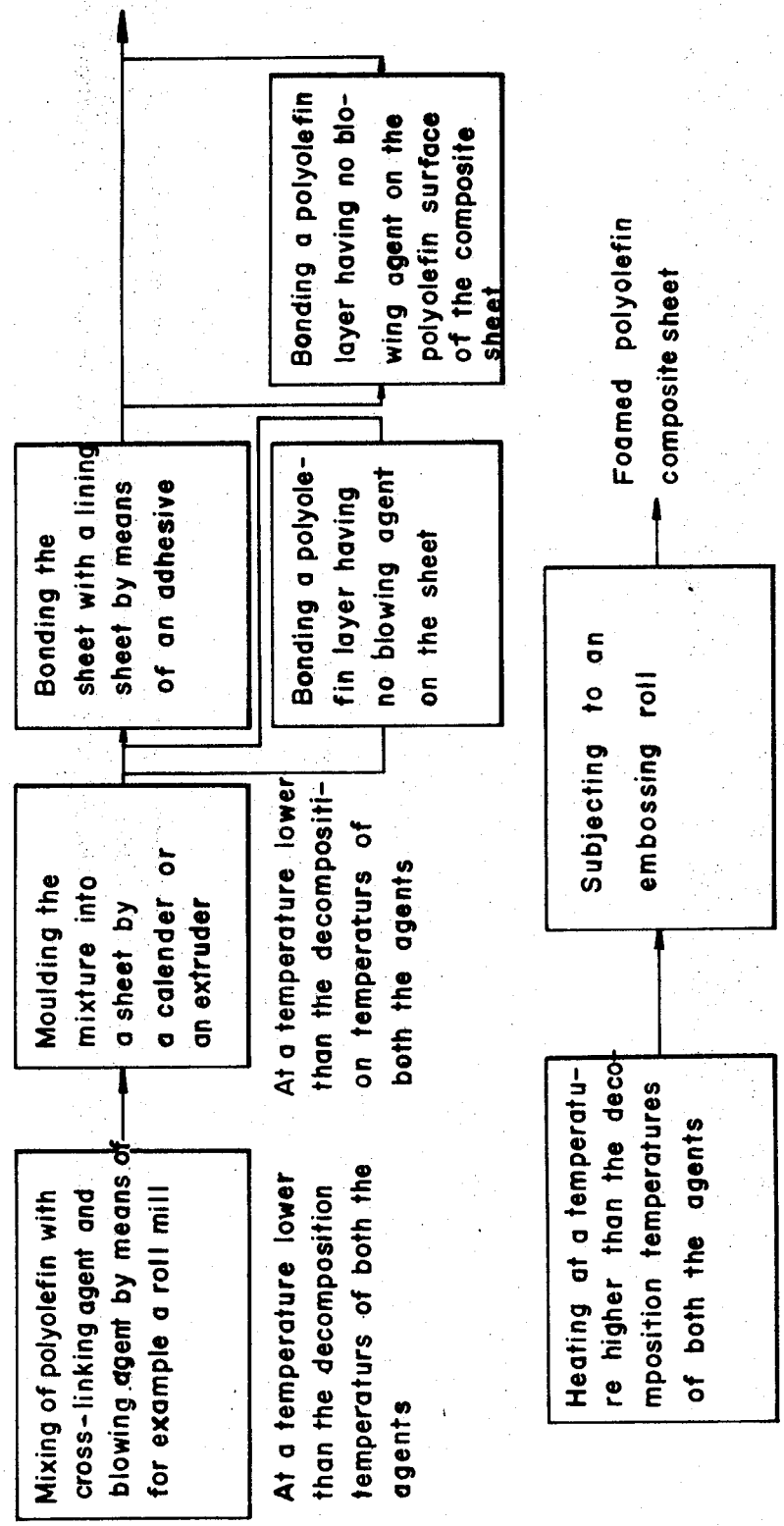

PRODUCTION OF FOAMED POLYOLEFIN COMPOSITE SHEET

The present invention relates to a method of producing a composite sheet composed of a foam comprising a polyolefin or a mixture of the polyolefin with rubber and/or plastic miscible therewith and a lining and to the resulting composite sheet.

The invention is characterized in that a polyolefin or a mixture of the polyolefin with rubber and/or plastic miscible therewith is milled with a cross-linking agent and a blowing agent to obtain a composition, which is moulded into a sheet and the resulting sheet is adhered with a lining, such as a cloth or a paper and then the resulting composite is heated to a temperature higher then decomposition temperatures of the cross-linking agent and the blowing agent, and thereafter subjected to embossing.

The term "polyolefin" used herein means polyolefin and the mixture of the polyolefin with rubber and/or plastic miscible therewith.

Polyolefins have excellent chemical, physical and electrical properties and such advantages that they are excellent in the workability and low in the cost and further the coloring can be effected freely and finely, so that they have been recently used broadly.

The polyolefin foam has these properties inherent to polyolefin and further, improved thermal insulation, soundabsorption, cushionability, etc., so that the polyolefin foam is highly useful in industry.

A method for producing polyolefin foam, which has previously been carried out, involves foaming polyolefin while extruding a mixture of polyolefin and a blowing agent through an extruder, whereby a foam is produced, or cross-linking polyolefin by means of a cross-linking agent or irradiation of an ionizing radiation and then forming a foam. The foam obtained in the former process is generally limited only to a foam having a very high density, while in the latter process a foam having a low density can be obtained, but a thin sheet has never been previously produced, because when heat melted the strength of the melted composition sheet is very small, so that the operation is difficult and further gas evolved by the decomposition of the blowing agent is lost off considerably.

The inventors have made various investigations in order to produce a thin polyolefin sheet having a low density and found that such an object can be firstly attained by milling the polyolefin with a cross-linking agent and a blowing agent, moulding the resulting composition into a sheet, adhering the sheet with a lining such as, cloth and paper and then heating the resulting composite at a temperature higher than decomposition temperatures of the cross-linking agent and the blowing agent to form cross-linkage and foam and thereafter subjecting to embossing.

In this manner, a very thin foamed composite sheet, for example, less than 1 mm., can be easily obtained.

The adhesion of the thin foamed polyolefin sheet with the lining in the present invention is remarkably high. Polyolefin has generally a very poor adhesive property, so that it has never been anticipated heretofore that such a high strong adhesion as in the product of the present invention can be obtained only by adhering a polyolefin composition with a lining, forming foam by heat and embossing.

The reason why such a strong adhesion can be obtained, is based on the following fact that when the polyolefin composition adhered with a lining is heated, the polyolefin composition is firstly melted and the contact area of the polyolefin composition melt and the lining is increased and then the polyolefin composition is cross-linked, foamed and expanded and in this case the expansion occurs on the surface and further in the concave portion of the lining, so that the adhesion of the lining and the foamed sheet becomes extremely strong. Accordingly, in the foamed composite sheet according to the present invention the foamed layer is incorporated with the lining, so that the strength is also very much higher than that of a conventional foam.

The foamed composite sheet according to the present invention is strong in the adhesion between the composition and the lining, so that even if a foaming composition having a higher rate of expansion than that of a conventional foamed polyvinyl chloride leather is used, said composition expands only in the thickness direction and a very smooth sheet having a low density can be obtained. It has never been anticipated that a cross-linked polyolefin having a tendency to expand in a similar shape, expands only in the thickness direction owing to the adhesion with the lining to obtain a smooth sheet.

The foamed composite sheet according to the present invention has been subjected to embossing, so that various beautiful patterns can be obtained, and further the adhesion of the foamed layer and the lining is highly increased. It has never been anticipated previously that the thus cross-linked polymer can provide beautiful pattern by embossing.

The foamed composite sheet according to the present invention has both the excellent characteristics of the lining and the foam and has a high strength, improved weather resistance, moisture resistance, thermal insulation, chemical resistance, etc., so that this foamed composite sheet can be used broadly, for example, for roofing, wall materials, floorings, various bags, shoe materials, materials used for vehicles, furnitures, etc. The lining, and the density and the thickness of the foam can be suitably selected depending upon the application and the conditions for use.

On the contrary, polyvinyl chloride leather used conventionally is insufficient in low temperature resistance and is hardened at a temperature lower than 0° C. and at about −20° C., cracks are liable to be caused and the hardness varies considerably in summer and winter. Furthermore, since said leather contains more than 50 percent of a plasticizer, the plasticizer blooms, and therefore dusts are deposited thereon, so that said leather is easily stained and further, the plasticizer migrates to the contacted material and this contacted material is deteriorated.

Moreover, polyvinyl chloride evolves poisonous gases, such as, gaseous chlorine, hydrogen chloride, etc. upon burning, so that there are problems in use for interior materials. On the other hand, the foamed polyolefin composite sheet does not contain any plasticizer and further has not any component which evolves poisonous gas, so that there are no defects as described above. Moreover, the foamed polyolefin composite sheet is more light about 20 to 30 percent than the polyvinyl chloride leather in the same rate of expansion, so that said composite sheet is highly suitable for application of travelling bags, chemical shoes, etc. which requires lightness.

The polyolefins to be used in the present invention include polyethylene made by high, medium or low pressure polymerization process, ethylene-propylene copolymer, ethylene-butene copolymer, ethylene-styrene copolymer, ethylene-vinyl acetate copolymer, ethylene-acrylic acid copolymer, ethylene-acrylic acid ester copolymer, ethylene-acrylic acid salt copolymer, polypropylene, polybutene-1, propylene-butene copolymer or mixture of two or more of these polymers.

The miscible rubber includes natural rubber, ethylene-propylene rubber, butyl rubber, polyisobutylene, polybutadiene, polyisoprene and styrene-butadiene rubber.

The miscible plastic includes acrylonitrile-butadiene-styrene resin, polystyrene, chlorinated polyethylene, chlorinated polypropylene and chlorosulfonated polyethylene.

The total amount of rubber and/or plastic to be mixed is the same as or less than that of polyolefin, preferably 10–45 parts by weight per 100 parts by weight of the polyolefin.

As the cross-linking agent to be used in the present invention, use may be made of organic peroxides, azido compounds and p-quinone-dioximes which can form cross-linkage in the polyolefins. The organic peroxide cross-linking agents are mainly used for polyethylene or polyethylene copolymers and these are dicumyl peroxide, 2,5-dimethyl-2,5-di(tert.-butyl-peroxy) hexane, di-tert.-butyl perterephthalate, tert.-butylhydroperoxide, di-tert.-butyl-peroxide, etc. The azido cross-linking agents are mainly used for polypropylene, polybutene-1 and the copolymers thereof and these are various polysulfonazides, azidoformates, aromatic polyazides, for example, 1,7-heptane-bis-sulfonazide, 1,10-decane-bissulfonazide, 4,4'-diphenylmethane-bis-sulfonazide, polyethylene-sulfonazide, n-octadecylazidoformate, phenylazidoformate, 2,2'-oxyethylene-bis-azidoformate, 4,4'-diphenyl-diazide, m-phenylene-diazide, etc.

The most suitable kind and the amount of the cross-linking agents to be added vary depending upon the kind of the polyolefin or the rubber and plastic to be mixed with polyolefin and the mixture ratio of said rubber or plastic to the polyolefin. The amount of the cross-linking agents to be usually added is 0.1–20 parts by weight, preferably 0.2–5 parts by weight per 100 parts by weight of the polyolefin. When the amount of the cross-linking agent to be added is less than 0.1 part, the cells may be nonuniform and coarse and when the amount is more than 20 parts by weight, the rate of expansion is suppressed.

The blowing agents to be used in the present invention should be decomposed at the same with or a higher temperature than the decomposition temperature of cross-linking agents for the polyolefin. Said agents include, for example, azodicarbonamide, di-nitrosopenta-methylene-tetramine, p,p'-oxy-bis-benzenesulfonylhydrazide, etc. In general, it is preferable to use the blowing agents having a decomposition temperature 10–30° C. higher than that of the cross-linking agents.

When the decomposition temperature of the blowing agent is lower than that of the cross-linking agent, a cross-linked polyolefin having a viscoelastic property preferable for foaming has not been formed prior to the foaming, so that an excellent foam cannot be obtained.

The amount of the blowing agent to be added varies depending upon the property of the desired foamed composite sheet and the kind of the blowing agent to be used, etc. and it is generally in the range of from 1 to 10 parts, preferably from 2 to 5 parts. When the amount of the blowing agent to be added is less than 1 part by weight, a foamed composite sheet having an extremely high density may be formed. While, when the amount is more than 10 parts by weight, the foamed layer may expand in three-dimensional direction and disengage from the lining.

In order to obtain the foamed composite sheet, in which the cells are uniform and the surface is smooth, it is preferable to mix an excess amount of the blowing agent, and suppress the expansion due to the decomposition of the blowing agent moderately.

Moreover, when conventionally used activators, such as zinc oxide, stearic acid salts, basic lead sulfate, urea compound, etc. are used, the evolution of gas is accelerated and homogenized as the temperature increases, so that an improved foam can be obtained. However, an addition of an excess amount of such an activator decreases the decomposition temperature of the blowing agent lower than that of the cross-linking agent and the blowing agent is decomposed prior to formation of cross-linkage, so that it is difficult to obtain an improved foam.

As the linings to be used in the present invention, cotton, staple fiber, rayon, etc. are preferable, but use may be made of cloth composed of linen, polyvinyl alcohol, polyester, polyacrylonitrile, polyamide and glass fiber fabrics and their nonwoven fabrics, paper and metal foils.

The adhesion with the polyolefin foam can be improved by previously applying various rubber series or resin series adhesives on the adhering surface of these linings.

The moulding of the polyolefin composition sheet according to the present invention should be carried out at a temperature lower than the decomposition temperatures of the cross-linking agent and the blowing agent, in general, within the range of 100 to 180° C. and is generally effected by calendering, but extrusion moulding also may be effected. In these cases, in order to promote the workability and not to decompose the cross-linking agent and the blowing agent, low molecular weight hydrocarbons, such as kerosene and paraffin-wax or stearic acid or the salts thereof and liquid polybutene may be added in an amount of 1 to 10 parts by weight based on 100 parts by weight of the polyolefin.

The foaming in the present invention is generally effected in a heating furnace having a conveyor belt. It is essential to decompose both the cross-linking agent and the blowing agent in one step. The foaming temperature varies depending upon the formulation of the composition to be used and in general, 170 to 300° C., preferably, 180 to 230° C. As the conveyor belt in the heating furnace, a gauze made of stainless steel is used and the size of the screen is preferably about 40 meshes.

The foamed composite sheet according to the present invention can provide very beautiful patterns by embossing after the foaming.

The thickness of the polyolefin composite sheet of this invention is 0.5–8 mm., preferably, 1–4 mm.

In order to improve the surface strength of the foamed composite sheet according to the present invention, such a manner may be adopted that polyolefin layer containing no blowing agent is adhered on the composition to be foamed and then the resulting composite is subjected to foaming, and if the polyolefin layer contains the cross-linking agent, the adhesion with the foamed layer is more improved and the foamed composite sheet having excellent heat resistance and high solvent resistance can be obtained.

Furthermore, according to the present invention it has been found that when on the surface layer of the foamed composite sheet an abrasion resistant coating, such as polyurethane, nylon coatings, etc. is provided, the abrasion resistance of the surface of the foamed layer can be highly improved and the foamed composite sheet has similar appearance and texture to those of the natural leather.

The means for providing such an abrasion resistant coating on the surface layer can be attained by applying said coating on the surface layer and then heating the coated foamed composite sheet, or coating the surface layer with said coating and then heating to foam the polyolefin composition. The adhesive strength between said coating and the surface layer in the latter process is higher than that in the former process.

Furthermore, usual polyolefin such as polyethylene has no polarity, so that it is necessary to provide a polymer layer having polarity, such as ethylene-vinyl acetate copolymer, ethylene-ethyl acrylate copolymer, vinyl chloride-vinyl acetate copolymer, etc. on the polyolefin surface layer and then to apply said coating on the polymer layer. However, when the polyolefin foamed layer has polarity as in the case of ethylene-vinyl acetate copolymer foamed layer, it is not necessary to provide the above described polymer layer and said coating can be directly coated on the polyolefin surface layer:

Furthermore, such a step for providing the polymer layer can be omitted by applying a mixture of the solution of the polymer having polarity and said coating, for example, a polymer solution of ethylene-ethyl acrylate copolymer and polyurethane coating by one step, so that this means is very economical in order to obtain polyolefin foamed composite sheet having a high abrasion resistance.

According to the present invention, foamed composite sheet, wherein the foamed layer is sandwiched with the linings, can be produced.

Moreover, the lining can be sandwiched with the foamed layers.

According to the present invention the foamed composite sheet can be subjected to printing, perforating, flocking, coating, vacuum metallizing, etc.

Furthermore, according to the present invention the surface of the foamed composite sheet may be treated by an oxidation process, (oxidant process, flame process, electric discharge process, ultraviolet ray process, etc.), polymer coating process, etc. before or after the foaming, in order to facilitate the above described treatments.

The accompanying drawing, sets forth in schematic fashion, the process of the present invention.

The invention will be further explained in detail by the following Examples which are not limitative to the scope of the invention.

The "part" in the following Examples means by weight.

EXAMPLE 1

100 parts of high pressure process polyethylene (melt index: 1 to 2) were milled with 0.3 part of dicumyl peroxide, 4 parts of azodicarbonamide, 1 part of tribasic lead sulphate, 0.2 part of cadmium stearate and 0.1 part of cyanine blue homogeneously and the resulting composition was moulded by an inverted L type calender into a sheet having a thickness of 0.3 mm., which was adhered with a knitted fabric previously applied with chloroprene adhesive and having a thickness of about 0.35 mm., during passing through the calender.

The resulting composite was heated in a furnace at 200° C. for 2 minutes to form cross-linkage and foam and then subjected to embossing by an embossed roll to obtain foamed polyolefin composite sheet.

The resulting foamed layer had a density of 0.25 g./cc. and uniform and fine cells, which expanded only in the thickness direction, and further had smooth and beautiful surface.

The comparison of the properties of the foamed composite sheet of the present invention with those of a conventional foamed polyvinyl chloride leather showed the following results:

|  | Product in this invention | Vinyl chloride leather |
| --- | --- | --- |
| thickness (mm.) | 1.2 | 0.9 |
| density of foam (g./cc.) | 0.25 | 0.5 |
| *tensile strength (kg./3cm.) | 27.5 | 27 |
| *elongation (%) | 31 | 31 |
| *tear strength (kg.) | 4.4 | 4.4 |
| *friction pull (kg./3cm.) | 1.8 | 1.6 |
| low temperature resistance | no conversion at −50° C. | cracks were caused at −20° C. |
| amount of decrease due to volatilization (%) | 0.1 | 2 |
| immersion in gasoline | no conversion | hardened |

*Tests were made according to JISK 6772.
The amount of decrease due to volatilization (%) was determined after heated at 100°C for 5 hours.
The immersion in gasoline showed the result after 1 hour at room temperature.

EXAMPLE 2

40 parts of high pressure process polyethylene (melt index: 7) were milled with 60 parts of ethylene-vinyl acetate copolymer (vinyl acetate content: 33 percent, melt index: 25), 0.5 part of dicumyl peroxide and 2 parts of azodicarbonamide homogeneously and the resulting composition was moulded by an extruder into a sheet having a thickness of 0.8 mm., which was adhered with a shirting previously applied with vinyl chloride-vinyl acetate copolymer adhesive and having a thickness of about 0.2 mm., during passing through the calender.

The resulting composite was heated in a furnace at 200° C for 5 minutes to form cross-linkage and foam, and then subjected to embossing, and further applied with a polyurethane coating on the surface thereof to obtain a foamed polyolefin composite sheet having a thickness of about 2.6 mm.

The resulting foamed layer had uniform and fine cells, which expanded only in the thickness direction, a smooth and uniform surface, a friction pull with the lining of 1.2 kg./cm., and further an improved abrasion resistance.

EXAMPLE 3

60 parts of high pressure process polyethylene (melt index: 1 to 2) were milled with 40 parts of ethylene-propylene copolymer (melt index: 3.5), 3 parts of 2,5-dimethyl-2,5-di(tert.-butylperoxy)hexane, 3 parts of azodicarbonamide homogeneously and the resulting composition was moulded by an inverted L type calender into a sheet having a thickness of 0.3 mm., which was adhered with a shirting previously applied with chloroprene adhesive and having a thickness of about 0.2 mm., during passing through the calender.

Furthermore, a composition composed of 60 parts of high pressure process polyethylene, 40 parts of ethylene-propylene copolymer and 3 parts of 2,5-dimethyl-2,5-di(tert.-butylperoxy)hexane was moulded by a calender into a sheet having a thickness of 0.15 mm., which was adhered on the layer to be foamed.

The resulting composite sheet was heated in a furnace at 200° C. for 5 minutes and then embossed. The resulting foamed composite sheet had a thickness of 1.25 mm., uniform and fine cells, and a smooth and beautiful surface. The adhesions between the shirting and the foamed layer and between the foamed layer and the nonfoamed layer were high respectively, and the strength was high. Even if the resulting composite sheet was exposed in out door for 2 years, the appearance did not vary.

EXAMPLE 4

70 parts of high pressure process polyethylene (melt index: 1 to 2), 30 parts of butyl rubber (Polysar-B-100, Mooney viscosity: 41-49, made by Polymer Corporation), 1 part of dicumyl peroxide and 3 parts of azodicarbonamide were milled homogeneously and the resulting composition was moulded by an inverted L type calender into a sheet having a thickness of 0.5 mm., which was adhered with aluminum foil previously applied with an adhesive during passing through the calender and then the resulting composite was heated at a temperature of 180° C. for 4 minutes to form foam and then subjected to embossing. The resulting composite sheet had fine cells and excellent thermal insulation, chemical resistance and moisture resistance.

EXAMPLE 5

80 parts of high pressure process polyethylene (melt index: 1 to 2), 20 parts of ABS resin (Abson resin: 810×102), 0.5 part of dicumyl peroxide, 2 parts of azodicarbonamide and 1 part of cadmium stearate were milled homogeneously and the resulting composition was moulded by an inverted L type calender into a sheet having a thickness of 0.3 mm., which was adhered with a kraft paper, during passing through the calender. The resulting composite was heated in a furnace at 180° C. for 5 minutes and then subjected to embossing. The obtained foamed composite sheet had smooth and beautiful surface and even and fine cells, and was extremely excellent in tensile strength.

EXAMPLE 6

100 parts of stereospecific polypropylene having a melt index of 4, 0.5 part of 1, 10-decane-bis-sulfonazide and 2 parts of azodicarbonamide were milled homogeneously at about 170° C. and the resulting composition was moulded by an inverted L type calender into a sheet having a thickness of 0.3 mm., which was adhered with a knitted fabric previously applied with chloroprene series adhesive and having a thickness of 0.34 mm. during passing through the calender.

The obtained composite was introduced into a hot air furnace provided with endless belt composed of gauze of 40 meshes and heated for 3 minutes by feeding a hot air at 230° C. at a rate of 5 m./sec. from the upper surface and at a rate of 10 m./sec. from the lower surface, while passing through the furnace to form cross-linkage and foam, and then subjected to embossing to obtain foamed polyolefin composite sheet having even and fine cells, which expanded in the thickness direction, and a smooth and beautiful surface.

This composite sheet had an improved heat resistance and did not vary at all even after heating at 100° C. for 24 hours.

EXAMPLE 7

100 parts of high pressure process polyethylene, 0.5 part of dicumyl peroxide, 4 parts of azodicarbonamide and 0.1 part of cadmium stearate were milled homogeneously and the resulting composition was moulded by an inverted L type calender into a sheet having a thickness of 0.5 mm., which was adhered with a shirting previously applied with nitrile rubber adhesive during passing through the calender. The resulting composite was heated in a furnace at 220° C. for 3 minutes to form cross-linkage and decompose the blowing agent and then passed through an embossing roll and thereafter cooled and wound.

The thus obtained foamed layer of the foamed composite sheet had a density of 0.2 g./cc.

When the foamed composite sheet was coated with the polyurethane, the adhesion was not complete and said polyurethane coating was easily disengaged from foamed layer.

On the other hand, when the above described composite sheet composed of the shirting and the polyethylene composition sheet was adhered with the ethylene-vinyl acetate copolymer sheet having a thickness of 0.2 mm. and then foamed by heating and thereafter coated with the above described polyurethane, the polyurethane coating was adhered closely.

Then, the composite sheet adhered with the ethylene-vinyl acetate copolymer sheet as described in the above paragraph was coated with the same polyurethane and then foamed by heating under the same conditions as described above.

The polyurethane coating of the thus obtained foamed composite sheet was never disengaged from the ethylene-vinyl acetate copolymer and further was extremely similar to natural leather in the appearance and the texture, and had improved weather resistance and abrasion resistance.

EXAMPLE 8

100 parts of high pressure process polyethylene were milled with 0.5 part of dicumyl peroxide, 4 parts of azodicarbonamide, 1 part of cadmium stearate homogeneously and the resulting composition was moulded by an inverted L type calender into a sheet having a thickness of 0.3 mm., the both sides of which were adhered with kraft papers previously applied with chloroprene adhesive, during passing through the calender.

The resulting composite was heated in a furnace at 220° C. for 3 minutes to form cross-linkage and decompose the blowing agent and then passed through an embossing roll and thereafter cooled and wound.

The foamed layer thus obtained foamed composite sheet had a density of 0.2 g./cc.

EXAMPLE 9

100 parts of high pressure process polyethylene were milled with 5 parts of kerosene, 0.3 part of dicumyl peroxide, 4 parts of azodicarbonamide and 0.5 part of cadmium stearate homogeneously and the resulting composition was moulded by an inverted L type calender into a sheet having a thickness of 0.3 mm. at about 100° C. which was adhered with a knitted fabric previously applied with chloroprene adhesive and having a thickness of about 0.35 mm. during passing through the calendar.

The resulting composite was heated in a furnace at 220° C. for 3 minutes to form cross-linkage and foam and then subjected to embossing by an emboss roll to obtain a foamed polyethylene composite sheet.

This foamed sheet was coated with a mixture of ethylene-ethyl acrylate copolymer and polyurethane, and heated and dried. The product thus obtained was very beautiful and had excellent abrasion resistance.

When the composition, in which kerosene was excluded from the above described formulation of the polyethylene composition, was subjected to sheeting, the sheeting could not be effected satisfactorily at a temperature of less than 115° C.

According to this example, it was found that when polyethylene was mixed with kerosene, the softening point of the polyethylene composition lowers, and the composition could be easily formed into sheet.

We claim:

1. A method for producing a foamed polyolefin composite sheet which comprises homogeneously milling a solid crystalline thermoplastic polyolefin selected from the group consisting of high, medium and low pressure process polyethylene, polypropylene, polybutene-1, ethylene-propylene-copolymers ethylene-butene copolymers, ethylene-styrene copolymers, ethylene-vinyl acetate copolymers, ethylene-acrylic acid copolymers, ethylene-acrylic acid ester copolymers, propylene-butene copolymers and a mixture of two or more of these polyolefins, with a cross-linking agent capable of cross-linking said polyolefin and selected from the group consisting of organic peroxide, polysulphonazides, azidoformates, aromatic plyazides and quinonedioximes, and a blowing agent selected from the group consisting of p,p'-oxybis-benzene sulfonyl-hydrazide, azodicarbonamide and dinitroso-pentamethylene-tetramine, at a temperature sufficient to melt said polyolefin but not to decompose said cross-linking agent ans said blowing agent to obtain the composition, molding said composition into a thin sheet by means of a calendar or an extruder at substantially the same temperature as described above, bonding a polyolefin layer containing no blowing agent on the thin sheet, further adhesively bonding a lining sheet selected from the group consisting of woven fabrics, nonwoven fabrics, paper and metal foils on the surface of the said polyolefin sheet containing said cross-linking agent and said blowing agent to form a laminate sheet, heating said laminate sheet at a temperature higher than the decomposition temperatures of the cross-linking agent and the blowing agent under atmospheric pressure to form cross-linkage and foam the polyolefin, and subjecting the thus treated sheet to embossing.

2. A method for producing a foamed polyolefin composite sheet which comprises homogeneously milling a solid crystalline thermoplastic polyolefin selected from the group consisting of high, medium and low pressure process polyethylene, polypropylene, polybutene-1, ethylene-propylene copolymers, ethylene-butene copolymers, ethylene-styrene copolymers, ethylene-vinyl acetate copolymers, ethylene-acrylic acid copolymers, ethylene-acrylic acid ester copolymers, propylene-butene copolymers and a mixture of two or more of these polyolefins with a cross-linking agent capable of cross-linking said polyolefin and selected from group consisting of organic peroxide, polysulphonazides, azidoformates, aromatic polyazides and quinonedioximes, and a blowing agent selected from the group consisting of p,p'-oxybis-benzene-sulfonyl hydrazide, azodicarbonamide and dinitroso-pentamethylene-tetramine, at a temperature sufficient to melt said polyolefin but not to decompose said cross-linking agent and said blowing agent to obtain a composition, molding said composition into a thin sheet by means of a calender or an extruder at substantially the same temperature as described above, bonding said sheet with a lining selected from the group consisting of woven fabrics, nonwoven fabrics, paper and metal foils to form a composite sheet by means of an adhesive, bonding a polyolefin layer containing no blowing agent on the surface of the polyolefin side of the above-described composition to form a laminate sheet, heating said laminate sheet at a temperature higher than the decomposition temperatures of the cross-linking agent and the blowing agent under atmospheric pressure to form cross-linkage and foam in said polyolefin, and subjecting the thus treated sheet to embossing.

3. A method as claimed in claim 2, wherein said olefin composition containing no blowing agent contains a cross-linking agent.

4. A method for producing a foamed polyolefin composite sheet, which comprises homogeneously milling a solid crystalline thermoplastic polyolefin selected from the group consisting of high, medium and low pressure process polyethylene, polypropylene, polybutene-1, ethylene-propylene copolymer, ethylene-butene copolymer, ethylene-styrene copolymer, ethylene-vinyl acetate copolymer, ethylene-acrylic acid copolymer, ethylene-acrylic acid ester copolymer, propylene-butene copolymer and a mixture of two or more of these polyolefins with a cross-linking agent capable of cross-linking said polyolefin and selected from the group consisting of organic peroxide, polysulphonazides, azidoformates, aromatic polyazides and quinonedioximes and a blowing agent selected from the group consisting of p,p'-oxybis-benzene-sulfonyl hydrazide, azodicarbonamide and dinitroso-pentamethylene-tetramine, at a temperature sufficient to melt said polyolefin but not to decompose said cross-linking agent and said blowing agent to obtain a composition, molding said composition into a thin sheet by means of a calendar or an extruder at substantially the same temperature as described above, bonding said sheet with a lining sheet selected from the group consisting of woven fabrics, nonwoven fabrics, paper and metal foils to form a composite sheet by means of an adhesive, heating said composite sheet at a temperature higher than the decomposition temperature of said cross-linking agent under atmospheric pressure to form cross-linkage and foam in said polyolefin and subjecting said thus treated sheet to embossing.

5. A method as claimed in claim 4, wherein said polyolefin involves a mixture of said polyolefin and at least one material selected from the group consisting of natural rubber, butyl rubber, polyisobutylene, polybutadiene, polyisoprene, styrene-butadiene rubber, acrylonitrile-butadiene-styrene resins, polystyrene, chlorinated polyethylene, chlorinated polypropylene and chlorosulfonated polyethylene.

6. A method as claimed in claim 4, wherein said cross-linking agent for polyethylene and the copolymers thereof is selected from the group consisting of dicumyl peroxide, 2,5-dimethyl-2,5-di(tert.butyl-peroxy)hexane, di-tert.butylperterephthalate, tert.butyl hydroperoxide and di-tert.butyl peroxide.

7. A method as claimed in claim 4, wherein said cross-linking agent for polypropylene, polybutene-1 and the copolymers thereof is selected from the group consisting of 1,7-heptane-bis-sulfonazide, 1,10-decane-bis-sulfonazide, 4,4'-diphenyl-methane-bis-sulfonazide, polyethylene-sulfonazide, n-octadecyl azidoformate, phenyl-azidoformate, 2,2'oxyethylene-bis-azidoformate, 4,4'-diphenyldiazide and m-phenylenediazide.

8. A method as claimed in claim 4, wherein said cross-linking agent is used in an amount of 0.1 to 20 parts by weight based on 100 parts by weight of the polyolefin.

9. A method as claimed in claim 4, wherein said cross-linking agent is used in an amount of 0.2 to 5 parts by weight based on 100 parts by weight of the polyolefin.

10. A method as claimed in claim 4, wherein said blowing agent is used in an amount of 1 to 10 parts by weight based on 100 parts by weight of polyolefin.

11. A method as claimed in claim 4, wherein said blowing agent is used in an amount of 2 to 5 parts by weight based on 100 parts by weight of polyolefin.

12. A method as claimed in claim 4, wherein said blowing agent is used together with an activator selected from the group consisting of zinc oxide, stearic acid salts, basic lead sulfate and urea compounds.

13. A method as claimed in claim 4, wherein the mixture of said blowing agent and said activator has a decomposition temperature of 10 to 30° C. higher than that of the cross-linking agent.

14. A method as claimed in claim 4, wherein said polyolefin composition is added with a moulding assistant selected from the group consisting of stearic acid, its salts, paraffin-wax, kerosene and liquid polybutene.

15. A method as claimed in claim 4, wherein said lining is selected from the group consisting of cotton, staple fiber, rayon, linen, polyvinyl alcohol, polyester, polyacrylonitrile, polyamide and glass fiber fabrics and their nonwoven fabrics, paper and metal foil.

16. A method as claimed in claim 4, wherein said composite sheet is heated at a temperature of 180–300° C. to effect cross-linking and foaming in one step.

17. A method as claimed in claim 4, wherein said composite sheet is heated at a temperature of 180–230° C.